United States Patent Office 3,654,287
Patented Apr. 4, 1972

3,654,287
SPIROINDANYLPIPERIDINES
Stanley J. Dykstra, Evansville, Ind., assignor to Mead Johnson & Company, Evansville, Ind.
No Drawing. Filed Aug. 26, 1970, Ser. No. 67,242
Int. Cl. C07d 29/28
U.S. Cl. 260—293.62
7 Claims

ABSTRACT OF THE DISCLOSURE

A class of compounds comprised of 3-phenylspiroindanylpiperidines having substituents on the piperidine nitrogen selected from the group consisting of hydrogen, lower alkyl, benzyl, phenethyl, dialkylaminoethyl, and alkoxy carbonyl, have been discovered. These compounds are useful as an antiulcler, analgesic and local anesthetic agents. One method of preparation is by heating 1,1-bis-(2-dialkylaminoethyl)-3-phenylindenes to eliminate trialkylamines. Subsequent dealkylation provides 3-phenylspiro[indene-1,4'-piperidine] which is reacted with an ester having the Formula RX wherein X is a reactive leaving group and R is the desired piperidine substituent. The 3-phenylspiroindenylpiperidines are converted to the corresponding 3-phenylspiroindanylpiperidines in the presence of hydrogen. Illustrative of the embodiments are 3-phenylspiro[indan-1,4'-piperidine] hydrochloride and 1'-(2-dimethylaminoethyl)-3-phenylspiro[indan-1,4' - piperidine] dihydrochloride.

SUMMARY OF THE INVENTION

The present invention is particularly concerned with spiroindanylpiperidines of Formula I and non-toxic pharmaceutically acceptable acid addition salts thereof.

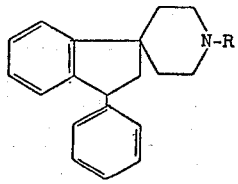

Formula I

These substances, characterized by Formula I, are new compositions of matter possessing valuable pharmacological properties which render them useful as synthetic medicinals. More particularly, the spiroindanylpiperidines in standard pharmacological tests in mammals have exhibited utility as antiulcer, analgesic, and local anesthetic agents. Apart from the above-mentioned uses, the spiroindanylpiperidines of Formula I also prevent reserpine ptosis in mammals which is an indication of antidepressant activity.

In the foregoing Formula I, the piperidine moiety can be substituted with various R groupings including hydrogen, lower alkyl of 1 to 4 carbon atoms inlcusive, benzyl, phenethyl, dialkylaminoethyl and alkoxycarbonyl. The dialkylaminoethyl substituent is represented by the symbol —$CH_2CH_2NR^1R^2$ wherein $R^1$ and $R^2$ are lower alkyl of from 1 to 4 carbon atoms inclusive. Representing the alkoxycarbonyl substitutent is the symbol —$CO_2R^3$ wherein $R^3$ is lower alkyl of from 1 to 4 carbon atoms inclusive. By the term "lower alkyl" as employed herein it is meant straight or branched chain alkyl radicals including methyl, ethyl, propyl, isopropyl, 1-butyl, 1-methylpropyl, 2-methylpropyl, and tert.-butyl.

As used herein, the term "non-toxic pharmaceutically acceptable acid addition salts" refers to salts of compounds of Formula I wherein R is hydrogen, lower alkyl, benzyl, phenethyl and dialkylaminoethyl with relatively non-toxic inorganic or organic acids. Illustrative of the variety of acids which may be used are sulfuric, phosphoric, hydrochloric, hydrobromic, hydroiodic, sulfamic, methanesulfonic, benzenesulfonic, para-toluenesulfonic, acetic, lactic, succinic, maleic, tartaric, citric, gluconic ascorbic, benzoic, cinnamic, and related acids.

Preparation of pharmaceutically acceptable acid addition salts of those compounds of the present invention which are capable of forming salts is accomplished by admixture of the bases with substantially one chemical equivalent of any of the various acids hereinabove defined. Generally, the salts are prepared in an inert solvent such as water, ether, benzene, ethanol or ethyl acetate.

The compounds of the present invention are synthesized according to a unitary process which comprises the following steps. Heating 1,1-bis(2-dimethylaminoethyl)-3-phenylindene so that trimethylamine is eliminated or reacting 3-phenylindene with bis(2-chloroethyl)benzylamine to provide a spiroindenylpiperidine having Formula II

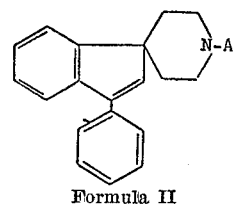

Formula II wherein A is methyl or benzyl. Converting the spiroindenylpiperidine of Formula II by known means such as heating with ethyl chloroformate to form an ethyl carbamate and hydrolyzing the ethyl carbamate to 3-phenylspiro[indene-1,4'-piperidine]. Reacting 3 - phenylspiro[indene-1,4'-piperidine] with an ester having the formula RX wherein R is as defined above and X is a reactive leaving group selected from the group consisting of halides, in particular, chlorine and bromine, lower alkoxy and sulfate to provide spiroindenylpiperidines of Formula III.

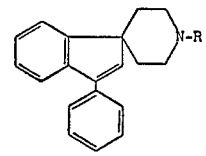

Formula III

The compounds of Formula III are converted to the spiroindanylpiperidines of Formula I in the presence of hydrogen.

The unitary process of the present invention for the preparation of the compounds of Formula I is further illustrated as follows. Pyrolysis of 1,1-bis(2-dimethylaminoethyl)-3-phenylindene (IV) according to Equation 1 provides 1'-methyl-3-phenylspiro[indene-1,4-piperidine] (V).

Equation 1

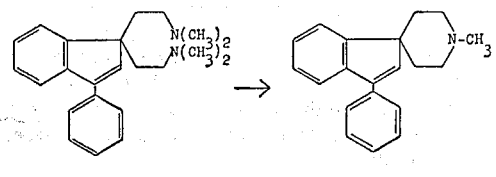

Formula IV          Formula V

The starting material 1,1-bis(2-dimethylaminoethyl)-3-phenylindene (IV) is prepared by the method discussed by C. R. Ganellin et al., Chem. and Ind. (London) 1256 (1965). Ganellin's method is generally suitable for the preparation of analogous 1,1-bis(2-dialkylaminoethyl)-1-phenylindenes and 1,1 - bis(2 - diaralkylaminoethyl)-3-phenylindenes which can be pyrolytically cyclized according to the present invention to provide alkyl and aralkyl substituted spiroindenes of Formula III such as 1'-ethyl-3-phenylspiro[indene-1,4'-piperidine],
1'-isopropyl-3-phenylspiro[indene-1,4'-piperidine],
1'-benzyl-3-phenylspiro[indene-1,4'-piperidine],
1'-phenethyl-3-phenylspiro[indene-1,4'-piperidine].

Alternatively, spiroindenylpiperidines of Formula III wherein R is alkyl or aralkyl including benzyl and phenethyl can be prepared as illustrated in Equation 2 wherein alkylation of 3-phenylindene (VI) with bis(2-chloroethyl)benzylamine and sodamide in liquid ammonia provides 1'-benzyl - 3 - phenylspiro[indene - 1,4 - piperidine] (VII).

Equation 2

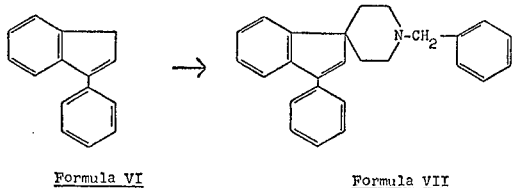

Formula VI      Formula VII

This method is applicable to preparation of other "1'-substituted" phenylspiroindenylpiperidines and provides another method of obtaining 1'-methyl-3-phenylspiro[indene-1,4'-piperidine],
1'-ethyl-3-phenylspiro[indene-1,4'-piperidine],
1'-isopropyl-3-phenylspiro[indene-1,4'-piperidine],
1'-tert.-butyl-3-phenylspiro[indene-1,4'-piperidine],
1'-phenethyl-3-phenylspiro[indene-1,4'-piperidine].

Treatment of 1'-methyl - 3 - phenylspiro[indene - 1,4'-piperidine] (VIII) with ethyl chloroformate affords ethyl 3-phenylspiro[indene-1,4'-piperidine] - 1' - carboxylate (IX) which is subsequently hydrolyzed to 3-phenylspiro[indene-1,4'-piperidine] (X) with base. These transformations are illustrated in Equation 3.

Equation 3

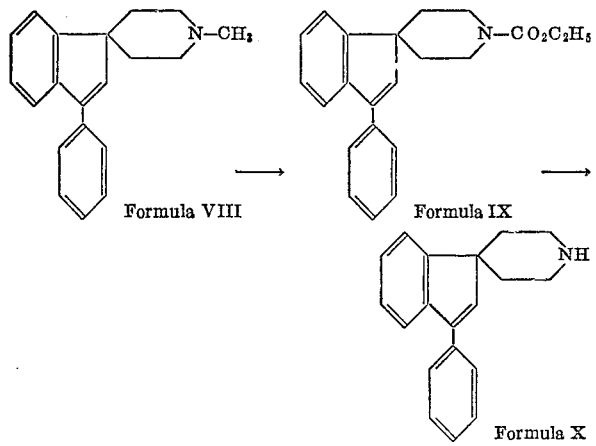

Formula VIII      Formula IX

Formula X

The 3-phenylspiro[indene - 1,4' - piperidine] (X) intermediate is particularly useful in the preparation of other spiroindenylpiperidine intermediates of Formula III. It is readily acylated with alkoxycarbonyl chlorides such as methyl chloroformate, isopropyl chloroformate, butyl chloroformate, and with tert.-butyl azidoformate to provide spiroindenylpiperidines having Formuula XI wherein $R^3$ is defined as above.

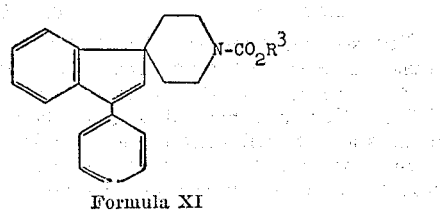

Formula XI

Exemplary of spiroindenylpiperidines of Formula XI are:

Methyl-3-phenylspiro[indene-1,4'-piperidine]-1'-carboxylate,
Isopropyl-3-phenylspiro[indene-1,4'-piperidine]-1'-carboxylate,
Butyl-3-phenylspiro[indene-1,4'-piperidine]-1'-carboxylate,
Tert.-butyl-3-phenylspiro[indene-1,4'-piperidine]-1'-carboylate.

3-phenylspiro[indene-1,4'-piperidine] may also be alkylated with dialkylaminoethyl halides to provide spiroindenylpiperidines having Formula XII wherein $R^1$ and $R^2$ are defined as above.

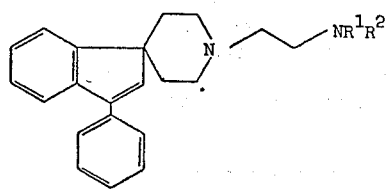

Formula XII

Exemplary of spiroindenylpiperidines of Formula XII are:

1'-(2-dimethylaminoethyl)-3-phenylspiro[indene-1,4'-piperidine],
1'-(2-diethylaminoethyl)-3-phenylspiro[indene-1,4'-piperidine],
1'-(2-diisopropylaminoethyl)-3-phenylspiro[indene-1,4'-piperidine],
1'-(2-dibutylaminoethyl)-3-phenylspiro[indene-1,4'-piperidine],
1'-[2-(N-ethyl-N-methylamino)ethyl]-3-phenylspiro[indene-1,4'-piperidine],
1'-[2-(N-butyl-N-methylamino)ethyl]-3-phenylspiro[indene-1,4'-piperidine].

Acylation of 3 - phenylspiro[indene - 1,4'-piperidine] with acyl halides such as acetyl chloride, secondary butyryl chloride, benzoyl chloride, phenylacetyl chloride followed by reduction of the amide intermediates thus obtained with lithium aluminum hydride yields spiroindenylpiperidines of Formula III including 1'-phenethyl-3-phenylsprio[indene-1,4'-piperidine],
1'-benzyl-3-phenylspiro[indene-1,4'-piperidine],
1'-ethyl-3-phenylspiro[indene-1,4'-piperidine],
1'-isobutyl-3-phenylspiro[indene-1,4'-piperidine].

Corresponding acylation of 3-phenylspiro[indan-1,4'-piperidine] and reduction of the amide intermediates provides spiroindanylpiperidines of Formula I including 1'-phenethyl-3-phenylspiro[indan-1,4'-piperidine],
1'-benzyl-3-phenylspiro[indan-1,4'-piperidine],
1'-ethyl-3-phenylspiro[indan-1,4'-piperidine],
1'-isobutyl-3-phenylspiro[indan-1,4'-piperidine].

In the present invention, the spiroindanylpiperidines of Formula I can also be prepared by reduction of the spiroindenylpiperidines of Formula I as illustrated in Equation 4.

Equation 4

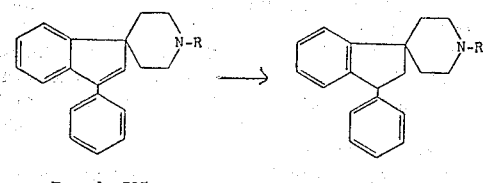

Formula III      Formula I

Preferably, the reduction is carried out employing a palladium on carbon catalyst under hydrogen at low pressure. Reduction of the spiroindenylpiperidines of Formula III with diborane also provides the compounds of Formula I.

Exemplary of the spiroindanylpiperidines of Formula I which can be prepared by reduction of the corresponding spiroindenylpiperidines of Formula III or by reaction of 3-phenylspiro[indan-1,4'-piperidine] with an ester having the formula RX wherein R and X are as hereinbefore defined:

1'-methyl-3-phenylspiro[indan-1,4'-piperidine],
1'-ethyl-3-phenylspiro[indan-1,4'-piperidine],
1'-isopropyl-3-phenylspiro[indan-1,4'-piperidine],
1'-benzyl-3-phenylspiro[indan-1,4'-piperidine],
1'-phenethyl-3-phenylspiro[indan-1,4'-piperidine],
1'-tert.-butyl-3-phenylspiro[indan-1,4'-piperidine],
methyl-3-phenylspiro[indan-1,4'-piperidine]-1'-carboxylate,
isopropyl-3-phenylspiro[indan-1,4'-piperidine]-1'-carboxylate,
butyl-3-phenylspiro[indan-1,4'-piperidine]-1'-carboxylate,
tert.-butyl-3-phenylspiro[indan-1,4'-piperidine]-1'-carboxylate,
1'-(2-diethylaminoethyl)-3-phenylspiro[indan-1,4'-piperidine],
1'-(2-diisopropylaminoethyl)-3-phenylspiro[indan-1,4'-piperidine],
1'-(2-dibutylaminoethyl)-3-phenylspiro[indan-1,4'-piperidine],
1'-[2-(N-ethyl-N-methylamino)ethyl]-3-phenylspiro[indan-1,4'-piperidine],
1'-[2-(N-butyl-N-methylamino)ethyl]-3-phenylspiro[indan-1,4'-piperidine].

Antiulcer activity of the compounds of the present invention can be readily demonstrated in the laboratory in rats having peptic ulcers produced by restraint. In this test, groups of 7–10 rats weighing from 50 to 150 grams are starved for 24 hrs. and then lightly anesthetized with ether. The test drug is administered subcutaneously and the rat placed on a wire screen. The wire screen is folded over the rat and stapled around the outer edges to restrict the movement of the rat. After the rat has regained consciousness, the screen is stapled more closely so as to restrict movement as completely as possible. After 4 hrs. the rats are killed and the stomachs removed and graded for incidence and severity of ulcers. The degree of incidence is graded on the basis of an all or none criterion, while severity is scored as 0 (no ulcers), 1 (minimal), 2 (average), and 4 (severe). A dose response curve is obtained according to accepted pharmacologic technique by administering various doses of the drug to groups of test animals. From the dose response curve, one can determine the $ED_{50}$ values which are the doses causing 50% reduction of the incidence and severity of ulcers. Representative $ED_{50}$ values for the decrease in incidence and severity of ulcer formation in the restrained rat for the compounds of the present invention are respectively 4.9 and 4.1 milligrams per kilogram of body weight for 3-phenylspiro[indan-1,4'-piperidine] hydrochloride and 7.7 and 8.2 milligrams per kilogram of body weight for 1'-(2-dimethylaminoethyl)-3-phenylspiro[indan-1,4'-piperidine] dihydrochloride.

Spiroindanylpiperidines of the present invention are active agents in the prevention of the phenylquinone writhing syndrome in mice which is considered to be presumptive evidence of analgetic action. The method of Hendershot and Forsaith, J. Pharmacol. Exp. Therap. 125, 237 (1959) is used to measure this effect. According to this test, groups of 10 to 20 mice are injected subcutaneously with graduated doses of the test compound. At the time of peak effect, as previously determined, the animals are administered a dose of 2.5 mg./kg. of phenylquinone intraperitoneally. The injection of phenylquinone produces a wirthing episode in the mice and the number of such episodes exhibited by each mouse during a ten minute period following the injection is counted and the average percent decrease in the number of episodes as compared to a control group of mice is recorded for each dose of test compound. A log dose-response curve is prepared and the dose of test compound required to decrease the number of writhing episodes by 50% is estimated by interpolation. In this test, the $ED_{50}$ value for 3-phenylspiro[indan-1,4'-piperidine] hydrochloride is 4.2 mg./kg. body weight.

The compounds of the present invention exhibit local anesthetic activity according to the test of Hirschfelder and Bieter, Physiol. Rev. 12, 190 (1932). In this test, different concentrations of the test compound are topically administered to the cornea of rabbits and the concentration necessary to anesthetize the cornea and thus abolish the corneal reflex is determined. Exemplary of the local anesthetic activity obtained with the compounds of the present invention is that exhibited by 3-phenylspiro[indan-1,4'-piperidine] hydrochloride and 1'-methyl-3-phenylspiro[indan-1,4'-piperidine]. The concentration values for 50% reduction of the corneal reflex ($EC_{50}$) for the former is 0.025% (weight/volume) and for the latter 0.04% (weight/volume). Procaine hydrochloride which is a well-known local anesthetic has an $EC_{50}$ of 0.14% in this test.

Some of the compounds of the present invention have antireserpine activity in addition to antiulcer, analgetic and local anesthetic action. For example, 3-phenylspiro[indan-1,4'-piperidine] hydrochloride and 1'-methyl-3-phenylspiro[indan-1,4'-piperidine] prevent reserpine ptosis in the mouse, an action which pharmacologically is generally assumed to be indicative of antidepressant activity. In the reserpine ptosis test, a predetermined dose of test compound is administered orally to each mouse in several groups of test mice. One hour later reserpine, 2.0 mg./kg., is injected intravenously, and one hour thereafter ptosis is measured by placing each mouse on a platform away from light and examining the extent of closure of the palpebral fissure. Ptosis is significant if the opening is less than 50% of normal. The reserpine effect is significantly modified if the palpebral opening is greater than 50% of normal. Various doses of drugs are administered to groups of test animals and then a dose response curve is constructed. From this, the $ED_{50}$ value, which is the dose antagonizing the reserpine effect in 50% of the animals, is calculated. Well known antidepressants such as amitriptyline and imipramine exhibit $ED_{50}$ valves for the prevention of reserpine ptosis in mice of 12.5 mg./kg. and 6.5 mg./kg. body weight respectively. The $ED_{50}$ values for 3-phenylspiro[indan-1,4'-piperidine] hydrochloride and 1'-methyl-3-phenylspiro[indan-1,4'-piperidine] are respectively 4.2 and 7.5 mg./kg. body weight.

Those skilled in the art will recognize that the dosage of the compounds of the present invention necessary for treating conditions in mammals responsive thereto will vary with the form of administration and the particular compound chosen. Furthermore, the dosage will vary with the particular mammal under treatment. In general, antiulcer and analgetic treatment is initiated with small dosages substantially less than the optimum dose of the compounds. Thereafter, the dosage is incrementally increased until the desired therapeutic effect is reached. It will be generally found that when the compounds are administered orally, larger quantities of the active agent will be required to produce the same effect as a smaller amount given parenterally. Forms of parenteral administration include subcutaneous, intravenous and intramuscular. In general, the compounds of this invention are most desirably administered at a concentration level that will generally afford effective results without causing any harmful or deleterious side effects. Preferably satisfactory results are obtained at a dosage level in the range from about 0.03 to 50 milligram per kilogram body weight per day of the mammal treated in divided doses 1 to 4 times a day or in a sustained release form.

Topical administration of the compounds of the present invention to mammals produce local anesthetic effects. Concentrations of the order of about 0.05 to about 0.5% are satisfactory for topical local anesthetic use in the eye. When used as a spray, or when applied by means of cotton applicators or packs, as well as when instilled into a cavity, the preferred dosage of the compounds of the present invention is 0.5 ml. to 5 ml. of a 4% solution which is equivalent to 20 mg. to 200 mg. In dentistry, the compounds of the present invention are swabbed onto previously dried oral mucosa prior to many odontological procedures preferably employing no more than a total volume of 5 ml. of 4% solution.

The compounds of Formula I may be compounded and formulated with organic or inorganic solid materials or liquids which are pharmaceutically acceptable carriers to provide pharmaceutical compositions of unit dosage form suitable for administration to mammals. The preferred unit dosage form comprises a pharmaceutical carrier and a spiroindanylpiperidine of Formula I in an amount ranging from about 0.03 to 50 milligrams per kilogram of body weight of the mammal treated. A unit dosage form which provides an effective dose of the compounds of the present invention can then be selected and administered to a mammal to elicit the desired therapeutic effect. Pharmaceutical compositions considered within the scope of this invention may take the form of tablets, powder, granules, capsules, suspension, solutions and the like. Suitable pharmaceutical carriers comprise both solids and liquids such as corn starch, lactose, calcium phosphate, stearic acid, polyethylene glycol, water, sesame seed oil, peanut oil, propylene glycol, and so forth.

The following examples illustrate the best mode contemplated for carrying out the present invention. They are merely illustrative and are not to be construed as limiting the scope of the claims in any manner whatsoever.

EXAMPLE 1

1'-methyl-3-phenylspiro[indan-1,4'-piperidine]

A mixture of 1,1 - bis(2 - dimethylaminoethyl) - 3-phenylindene (5.0 g., 0.0148 mole) and the dihydrochloride salt thereof (6.0 g., 0.0148 mole) prepared according to C. R. Ganellin et al., Chem. and Ind. (London), 1256 (1965) is heated under water-pump vacuum at 270–280° C. for a 10 minute period. The pyrolized product is dissolved in chloroform, the chloroform solution shaken with 10% sodium hydroxide, the chloroform layer separated, washed with water and dried over anhydrous potassium carbonate. Evaporation of the chloroform solvent provides 1' - methyl - 3 - phenylspiro[indene - 1,4' - piperidine] as the free base which is purified by distillation and has a boiling point of 151–155° C. at 0.2 mm. Hg, $n_D^{20}$ 1.6069.

Analysis.—Calcd. for $C_{20}H_{21}N$ (percent): C, 87.22; H, 7.69; N, 5.09. Found (percent): C, 87.59; H, 7.52; N, 5.12.

The free base in isopropanol is treated with ethanolic hydrogen chloride to provide the hydrochloride salt thereof. Crystallization of the salt from isopropanol-isopropylether yields analytically pure 1' - methyl-3-phenylspiro[indene - 1,4' - piperidine] hydrochloride which has a melting point of 292–294° C. (dec.).

Analysis.—Calcd. for $C_{20}H_{22}ClN$ (percent): C, 77.02; H, 7.11; Cl, 11.37. Found (percent): C, 77.15; H, 6.98; Cl, 11.21.

A solution of 1' - methyl - 3 - phenylspiro[indene-1,4'-piperidine] (7.1 g., 0.0257 mole) in 70 ml. of absolute ethanol is reduced in a Parr hydrogenator employing about 0.2 g. of 10% palladium on carbon catalyst. The reduction is complete in about 1.5 hr. The catalyst is collected and the filtrate concentrated in vacuo to provide 5.8 g. of residue which is crystallized from heptane to provide 3.7 g. (52% yield) of 1' - methyl - 3 - phenylspiro[indan - 1,4' - piperidine] having a melting point of 102.5–104.5° C. (corr.).

Analysis.—Calcd. for $C_{20}H_{23}N$ (percent): C, 86.59; H, 8.36; N, 5.05. Found (percent): C, 86.33; H, 8.32; N, 4.74.

EXAMPLE 2

Ethyl 3-phenylspiro[indan-1,4'-piperidine]-1'-carboxylate

A solution of 1' - methyl - 3 - phenylspirol[indene-1,4'-piperidine] (17.6 g., 0.64 mole) in 30 ml. of benzene is added dropwise with stirring to ethyl chloroformate (21.7 g., 0.2 mole) in 20 ml. of benzene. After refluxing the mixture for 6 hr., sufficient 1:1 water-ether is added until solids are dissolved. The organic phase is separated and extracted with 3 N hydrochloric acid and dried over magnesium sulfate. Evaporation of the solvents yields 15.4 g. (72% yield) of crude product which is crystallized from absolute ethanol to provide 13.6 g. (64%) of ethyl 3-phenylspiro[indene - 1,4' - piperidine]-1'-carboxylate.

Analysis.—Calcd. for $C_{22}H_{23}NO_2$ (percent): C, 79.25; H, 6.95; N, 9.60. Found (percent): C, 79.55; H, 6.55; N, 9.90.

Reduction of 3-phenylspiro[indene - 1,4' - piperidine]-1' - carboxylate according to Example 1 provides ethyl 3-phenylspiro[indan-1,4'-piperidine]-1'-carboxylate.

EXAMPLE 3

3-phenylspiro[indan-1,4'-piperidine]hydrochloride

A solution of ethyl 3-phenylspiro[indene - 1,4' - piperidine] - 1' - carboxylate (12.5 g., 0.038 mole) in 80 ml. of ethanol containing 50 g. of potassium hydroxide is refluxed under nitrogen for 10 hr. The mixture is diluted with water, and concentrated under vacuum to remove ethanol. The resulting aqueous mixture is extracted with two 100 ml. portions of ether. Shaking the combined ethereal extracts with 2 N hydrochloric acid provides a precipitate which is collected, weight 10.3 g., melting point 220–223° C. Crystallization of this material from 95% ethanol affords 9.2 g. (76% yield) of 3-phenylspiro-[indene-1,4'-piperidine] hydrochloride hydrate.

Analysis.—Calcd. for $C_{19}H_{22}ClNO$ (percent): C, 72.25; H, 7.02; Cl, 11.23; $H_2O$, 5.71. Found (percent): C, 72.52; H, 7.30; Cl, 10.98; $H_2O$, 6.01.

An ethanolic solution (100 ml.) of 3-phenylspiro[idene-1,4'-piperidine] hydrochloride hydrate (31.3 g., 0.12 mole) is hydrogenated in a Parr apparatus employing 1.2 g. of 10% palladium on carbon catalyst. The reduction is complete in about 30 hr. after which the catalyst is collected and the filtrate concentrated to provide a solid residue. This solid residue is dissolved in ether and extracted with 100 ml. of 3 N hydrochloric acid. A white precipitate forms in the acid extract which is collected and crystallized from ethanol to provide 32 g. (81% yield) of 3-phenylpsiro[indan-1,4'-piperidine] hydrochloride.

Analysis.—Calcd. for $C_{19}H_{22}ClN$ (percent): C, 76.1; H, 7.4; Cl, 11.8. Found (percent): C, 76.2; H, 7.5; Cl, 11.9.

EXAMPLE 4

1'-phenethyl-3-phenylspiro[indan-1,4'-piperidine] hydrochloride

A slurry of 3-phenylspiro[indan-1,4'-piperidine] hydrochloride (6.0 g., 0.02 mole) in 50 ml. of benzene is neutralized with 10% sodium hydroxide by stirring until the hydrochloride salt dissolves. The benzene layer is separated and dried over potassium carbonate. Evaporation of the benzene solution under vacuum provides the solid free base which is taken up in 50 ml. of hot pyridine. Phenylacetyl chloride (3.4 g., 0.022 mole) dissolved in 25 ml. of benzene is added and the pyridine mixture heated for 2 hr. at 100° C. after which it is poured into 500 ml. of water and the aqueous pyridine mixture extracted with three 50 ml. portions of benzene. The combined benzene extracts are washed with dilute hydrochloric acid and then dried over potassium carbonate. Evaporation of the benzene solvent provides solid 1'-phenacetyl-3-phenylspiro [indan-1,4'-piperidine]. Crystallization from acetonitrile provides analytically pure product, M.P. 145–147° C. (uncorr.).

*Analysis.*—Calcd. for $C_{27}H_{27}NO$ (percent): C, 85.00; H, 7.13. Found (percent): C, 85.21; H, 7.30.

A tetrahydrofuran solution (20 ml.) of 1'-phenacetyl-3-phenylspiro[indan-1,4'-piperidine] (4.0 g., 0.0106 mole) is added to a slurry of lithium aluminum hydride (0.5 g., 0.013 mole) in 30 ml. of tetrahydrofuran. The mixture is refluxed for 20 hr. and then decomposed with water and 15% sodium hydroxide. The hydrolyzed mixture is filtered and the filtrate concentrated under vacuum to provide 4.0 g. of residue which is extracted first with water and then with 1 N hydrochloric acid. A precipitate forms in the acid extract which is collected and crystallized from ethanol to provide analytically pure 1'-phenethyl-3-phenyl-spiro[indan-1,4'-piperidine] hydrochloride.

*Analysis.*—Calcd. for $C_{27}H_{30}ClN$ (percent): C, 80.27; H, 7.49; Cl, 8.78. Found (percent): C, 80.41; H, 7.53; Cl. 8.73. M.P. 280.5–282.5° C. (corr.)(dec.).

EXAMPLE 5

1'-(2-dimethylaminoethyl)-3-phenylspiro[indan-1,4'-piperidine] dihydrochloride

Addition of 3-phenylspiro[indan-1,4'-piperidine] hydrochloride (6.0 g., 0.02 mole) to sodamide (3.9 g., 0.1 mole) in 40 ml. of dimethylformamide is followed by dimethylaminoethyl chloride hydrochloride (3.2 g., 0.022 mole). The mixture is stirred for 3 hr. at 100–105° C. and finally for an additional 16 hr. at 25° C. It is then poured into 600 ml. of water and the aqueous mixture extracted with four 100 ml. portions of ether. Evaporation of the ether solvent provides a residue which is stirred with about 25 ml. of 2 N hydrochloric acid. Insoluble 1'-(2-dimethylaminoethyl) - 3 - phenylspiro[indan-1,4'-piperidine] dihydrochloride precipitates therefrom and is collected. The acidic filtrate is concentrated in vacuo, and the resulting residue crystallized from 1:1 ethanol-benzene to provide analytically pure 1'-(2-dimethylaminoethyl) - 3 - phenyl-spiro[indan-1,4'-piperidine] dihydrochloride.

*Analysis.*—Calcd. for $C_{23}H_{32}Cl_2N_2$ (percent): C, 67.81; H, 7.92; N, 6.88. Found (percent): C, 67.99; H, 8.19; N, 6.70.

EXAMPLE 6

Tablets

The spiroindanylpiperidines of the present invention are compounded into tablets according to the following example.

| Materials: | Amount, g. |
|---|---|
| 3 - phenylspiro[indan-1,4'-piperidine] hydrochloride | 57.0 |
| Magnesium stearate | 1.3 |
| Corn starch | 12.4 |
| Corn starch pregelatinized | 1.3 |
| Lactose | 188.0 |

The foregoing materials are blended in a twin-shell blender and granulated and pressed into tablets weighing 250 mg. each. Each tablet contains 57.0 mg. of 3-phenyl-spiro[indan-1,4'-piperidine] hydrochloride or 50 milligrams of the biologically active base.

EXAMPLE 7

Capsules

Hard gelatin capsules are filled with a mixture consisting of 80 g. of 3-phenylspiro[indan-1,4'-piperidine] hydrochloride and 120 g. of corn starch so that each capsule contains 50 milligrams of the biologically active base, 3-phenylspiro[indan-1,4'-piperidine] hydrochloride.

EXAMPLE 8

Solution for oral, parenteral or topical administration

A sterile aqueous solution having a concentration of 40 milligrams per kilogram of 1'-methyl-3-phenylspiro [indan-1,4'-piperidine] hydrochloride is prepared by dissolving 400 grams of the substance in 9 liters of water for injection, U.S.P., adjusting the pH to 5.5 with dilute aqueous sodium hydroxide and dilution to 10 liters. This solution is then filtered sparkling clear and filled into 2 ml. glass ampoules and sealed. The ampoules are then sterilized by heating.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A compound selected from the group consisting of a compound having the formula

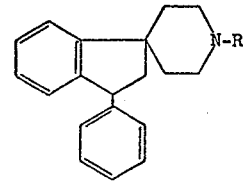

wherein R is hydrogen, lower alkyl of 1 to 4 carbon atoms inclusive, benzyl, phenethyl, dialkylaminoethyl and alkoxycarbonyl; said dialkylaminoethyl is represented by the symbol —$CH_2CH_2NR^1R^2$ wherein $R^1$ and $R^2$ are lower alkyl of from 1 to 4 carbon atoms inclusive, and said alkoxycarbonyl is represented by the symbol —$CO_2R^3$ wherein $R^3$ is lower alkyl from 1 to 4 carbon atoms inclusive.

2. A non-toxic pharmaceutically acceptable acid addition salt of a compound as claimed in claim 1 wherein R is hydrogen, lower alkyl, benzyl, phenethyl, and dialkyl-aminoethyl.

3. The compound of the group defined in claim 1 which is 3-phenylspiro[indan-1,4'-piperidine].

4. The compound of the group defined in claim 1 which is 3-phenylspiro[indan-1,4'-piperidine]hydrochloride.

5. The compound of the group defined in claim 1 which is 1'-(2-dimethylaminoethyl)-3-phenylspiro[indan-1,4'-piperidine].

6. The compound of the group defined in claim 1 which is 1'-(2-dimethylaminoethyl)-3-phenylspiro[indan-1,4'-piperidine]dihydrochloride.

7. The compound of the group defined in claim 1 which is 1'-methyl-3-phenylspiro[indan-1,4'-piperidine].

References Cited

UNITED STATES PATENTS 3,125,580   3/1964   Janssen _____ 260—293

HENRY R. JILES, Primary Examiner

G. T. TODD, Assistant Examiner

U.S. Cl. X.R.

260—570.5 P; 424—267